Feb. 17, 1953    R. E. ORTON    2,628,470
ROTARY HYDRAULIC TRANSMISSION PRIME MOVER CONTROL
Filed Sept. 8, 1951    4 Sheets-Sheet 4
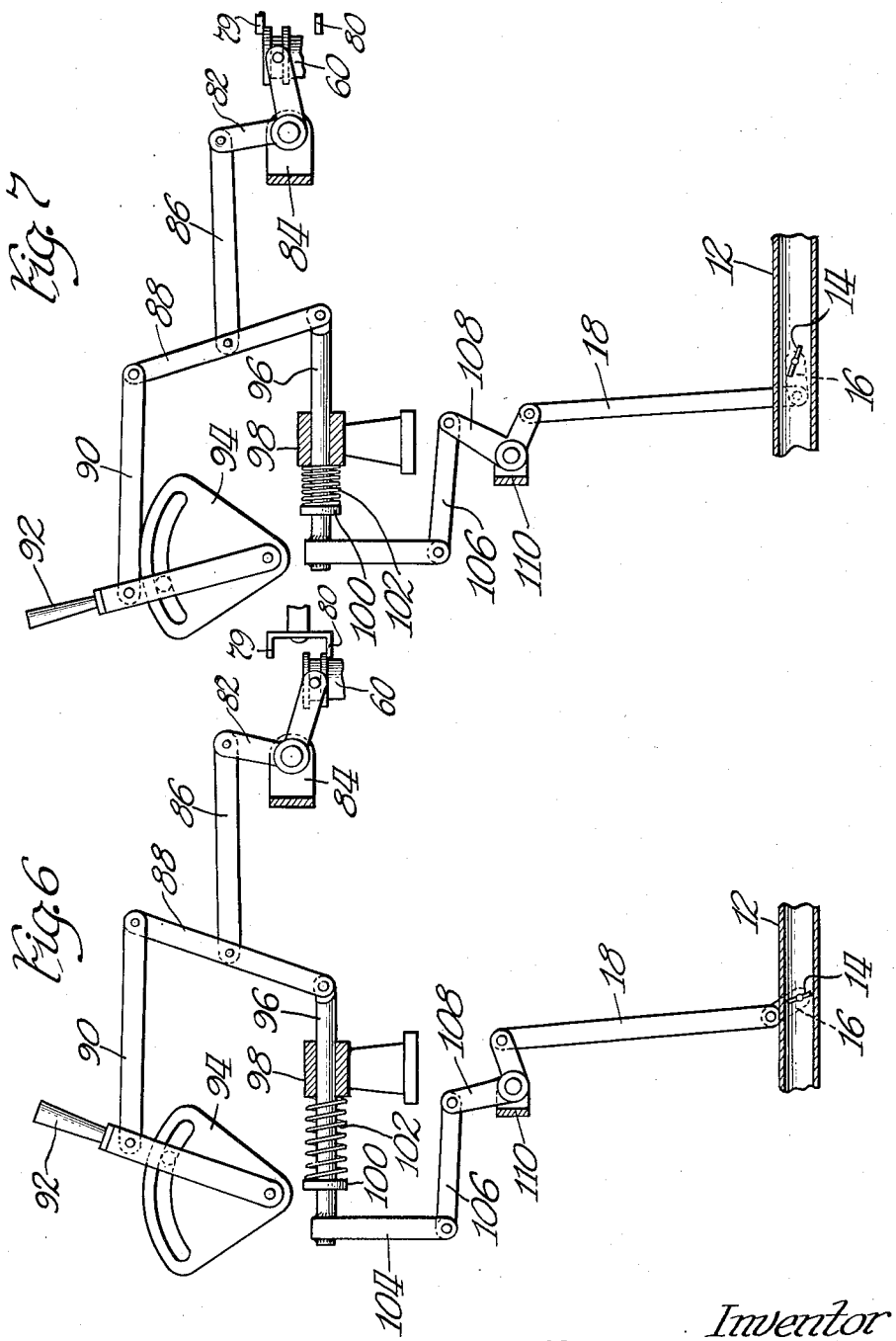
Inventor
Raymond E. Orton
by Bair, Freeman & Molinare
Attys.

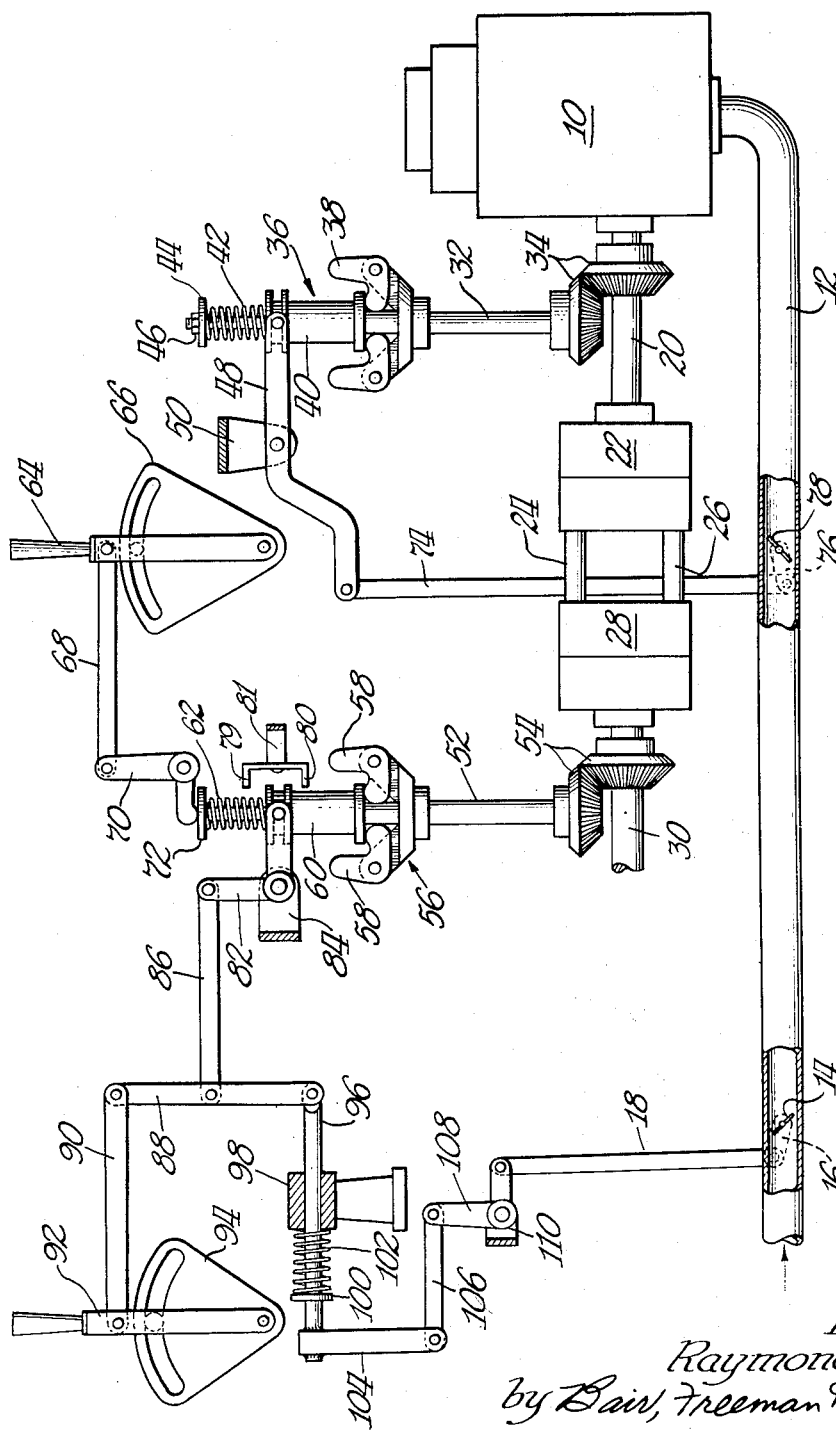

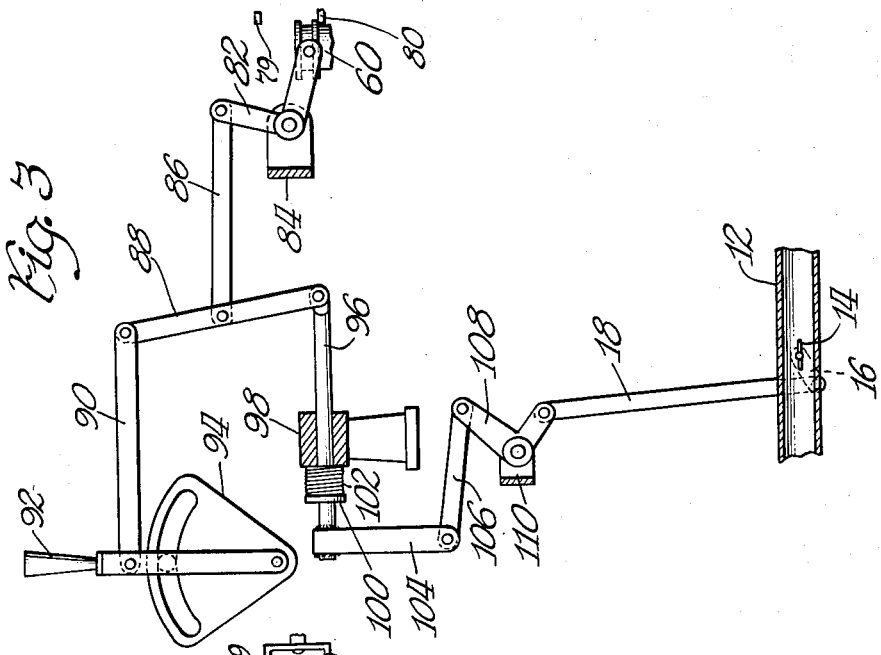
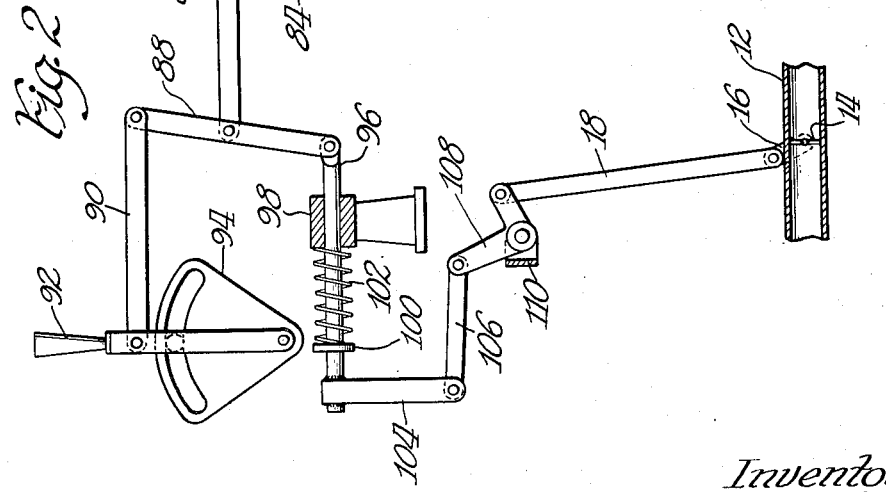

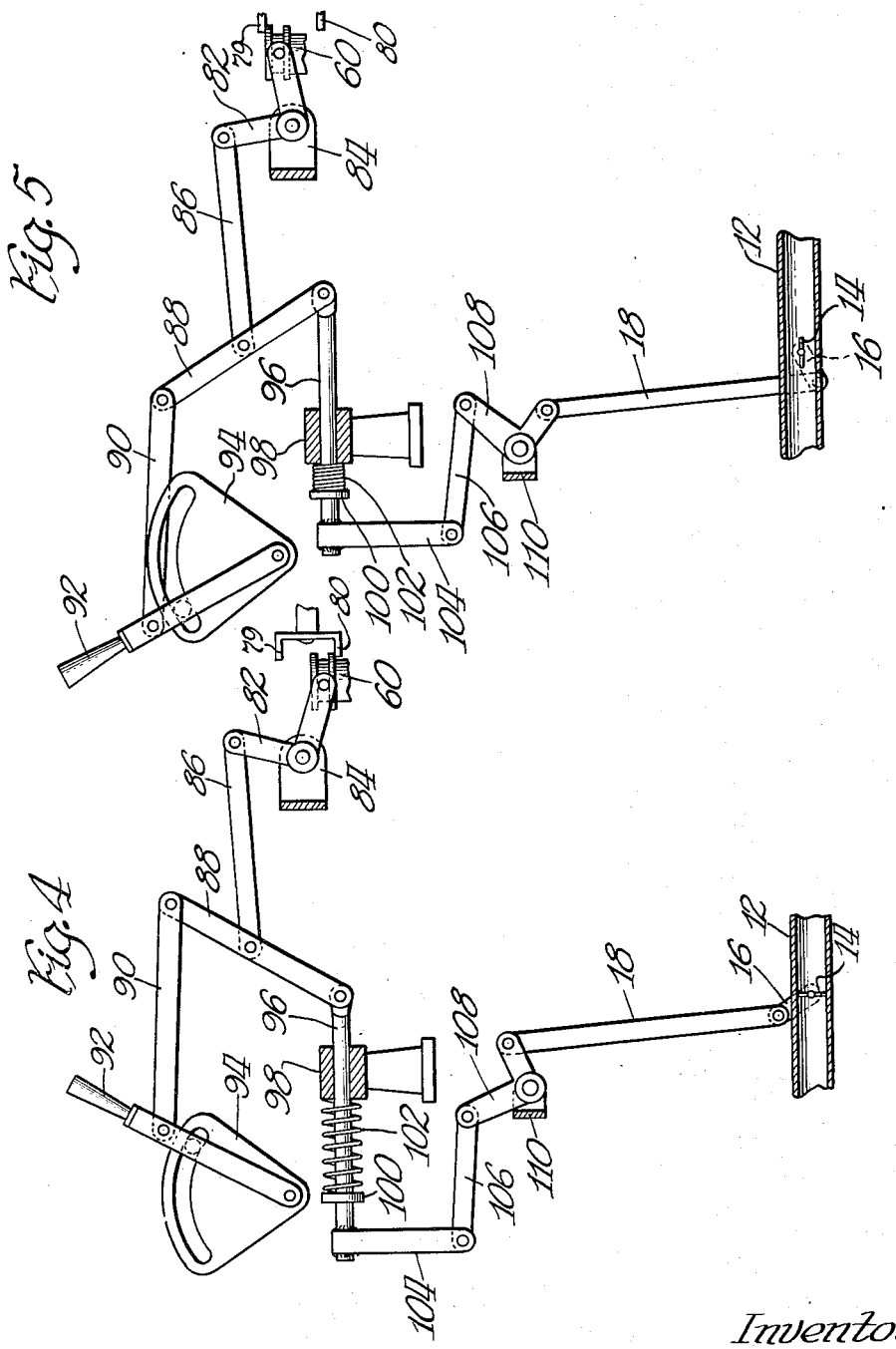

Patented Feb. 17, 1953

2,628,470

UNITED STATES PATENT OFFICE 2,628,470

ROTARY HYDRAULIC TRANSMISSION PRIME MOVER CONTROL

Raymond E. Orton, Chicago, Ill., assignor to Orton Crane & Shovel Company, Chicago, Ill., a corporation of Indiana Application September 8, 1951, Serial No. 245,755

14 Claims. (Cl. 60—19)

This invention relates to a power plant and control means therefor. More particularly the invention pertains to controls for prime movers of cranes and the like, including an internal combustion motor (ordinarily of the gasoline engine type) and a hydraulic power transmission system.

In operation of cranes (such as locomotive cranes) the operation conditions vary widely and the methods of operation and of control must be varied according to the conditions under which the crane is being operated. In work such as scrap handling with a magnet, handling various material with a clamshell bucket, and the like, some constant line speed is highly desirable and varying line speeds could interfere seriously with efficient operation. Further, the magnitude of the constant line speed will vary according to the particular loads being handled.

In travel of the crane, and in handling heavy loads, constant line speeds are not desirable, at least when such loads are initially set in motion. In such cases, operation must be started with maximum push of the crane at minimum line speed. Sometimes, after movement of the load has been initiated, it is thereafter desirable to operate at some constant line speed.

It is, therefore, an important object of the present invention to provide a prime mover for cranes and the like that includes controls meeting all the requirements set by the varying conditions under which the crane may be operated.

Another important object is to provide a prime mover and controls therefor of the type indicated, including an internal combustion motor, the controls being operative to bring about operation of the prime mover with consumption of a minimum amount of fuel.

Other and further objects and features of this invention will become apparent from the following description and appended claims as illustrated by the accompanying drawings showing diagrammatically, and by way of an example, a power plant according to the present invention. More particularly:

Figure 1 is a diagrammatic side elevational view, with parts shown in vertical section and other parts broken off, of a power plant according to the present invention;

Figure 2 is a fragmentary side elevational view showing parts of the control system of the plant of Figure 1 and illustrating one position of certain governor-controlled parts operative to maintain a constant line speed;

Figure 3 is a view similar to Figure 2 but shows another position of said governor-controlled parts;

Figure 4 is another view similar to Figure 2 but shows said governor-controlled parts in an extreme position assumed after operation of a manual control;

Figure 5 is a view similar to Figure 4 but shows said governor-controlled parts in another extreme position assumed after operation of a manual control;

Figure 6 is another view similar to Figure 4 but shows said governor-controlled parts after operation of said manual control in a position short of the extreme position shown in Figure 4;

Figure 7 is a view similar to Figure 5 but shows said governor-controlled parts after operation of said manual control in a position short of the extreme position shown in Figure 5.

The power plant of Figure 1 includes a gasoline engine 10 having a fuel inlet conduit 12 with a throttle valve 14 movable (only over an arc of 90°) by an arm 16 rigidly connected to a rocking shaft carrying the throttle valve and a link 18 pivotally connected to the arm 16. The gasoline engine 10 further has an output shaft 20 driving a liquid pump 22 (which may be of the radial vane rotor type) having inlet and outlet conduits 24 and 26 in communication with a hydraulic motor 28 (which may be of the radial vane rotor type) having an output shaft 30. The pump 22 and motor 28 are of any suitable conventional construction as used in hydraulic power transmission systems, for instance, the hydraulic transmission system commercially known under the trade-mark "Dynaflow."

The gasoline engine output shaft 20 drives a shaft 32 through a pair of bevel gears 34. The shaft 32 carries a governor generally indicated at 36 which may be of any suitable conventional construction. For instance, the governor may include a pair of fly weights 38 revolving with the shaft 32 and a riser 40 actuated by the fly weights against the force of a spring 42 which biases the riser 40 downwardly. The actual biasing force exerted by the spring 42 may be varied by adjusting the position on the shaft 32 of a collar 44 against which the upper end of the spring 42 rests, as by rotation of a nut 46 threaded over the upper end of the shaft 32. Movement of the riser 40 serves to actuate a lever 48 fulcrumed on a fixed member 50. The governor 36 serves to set an upper limit for the rate of operation of the gasoline engine 10, which upper limit can be varied by adjusting the position of the collar 44. More particularly, the outer end of the lever 48 is pivotally connected to the upper end of a link 74 having a lower end pivotally connected to an arm 76. The latter is rigidly connected to a rock shaft carrying a throttle valve 78 within the fuel line 12. When the riser 40 of the governor 36 rises to a predetermined level, power transmitted from the governor 36 through the lever 48, the link 74, the arm 76 and the rock shaft turns the throttle valve 78 in the conduit 12 to prevent further increase in rate of fuel flow through the conduit 12 to the engine 10.

Another shaft 52 is driven from the output shaft 30 of the hydraulic power transmission device 22, 28 through bevel gears 54. The shaft carries a governor generally indicated at 56 of any suitable conventional construction. Thus, the governor 56 may be constructed similarly to the governor 36 to include a pair of fly weights 58 actuating a riser 60, the upward movement of which is resisted by a spring 62. The force exerted by this spring may be predetermined by manual adjustment of a control lever 64 arranged on a quadrant 66 and having pivotally connected thereto one end of a link 68. The other end of this link is pivotally connected to one arm of a bell crank 70 fulcrumed at a fixed point. The other end of the bell crank 70 extends over a plate or collar 72 movable axially of the shaft 52 on which the upper end of the spring 62 rests. The quadrant 66 may be suitably calibrated so that setting of the control lever 64 in any particular angular position on the quadrant 66 will vary the response of the governor 56 to the rate of revolution of the shaft 52 in a predetermined manner for purposes explained in detail hereinbelow.

Upward and downward movements of the riser 60 of the governor are limited, respectively, by stops 79 and 80 attached to a fixed member 81.

Movement of the riser 60 of the governor 56 actuates one arm of a bell crank 82 fulcrumed on a fixed member 84. The other arm of this bell crank is pivotally connected to one end of a link 86 which, in turn, has its other end pivotally connected to a lever 88 between the ends of the latter. The upper end of the lever 88 is pivotally connected to one end of a link 90. The other end of the link 90 is pivotally connected to a control lever 92 on a calibrated quadrant 94. The lower end of the lever 88 is pivotally connected to one end of a shaft 96 slidable in a fixed journal 98. The shaft 96 carries a collar 100, and a spring 102 is provided between the collar 100 and the journal 98 to bias the shaft away from the journal. An arm 104 depends rigidly from the left end of the shaft 96. A link 106 has one end pivotally connected to the free end of the arm 104 and another end pivotally connected to one arm of a bell crank 108 fulcrumed in a fixed member 110. The other end of the bell crank 108 is pivotally connected to the upper end of a link 18, which actuates the arm 16 controlling the angular position of the throttle valve 14.

It will be apparent that the position of the throttle valve 14 is controlled by the reciprocation of the shaft 96. Reciprocation of the shaft 96 is effected by movement of the control lever 92 and/or by the governor 56. The operation of the governor 56 is controlled by the setting of the control lever 64. The functions, in particular of the control levers 64 and 92 and of the governor 56, are explained in greater detail hereinbelow, with special reference to Figures 2 through 7 of the drawings.

When, as shown in Figures 2 and 3, the control lever 92 is set in vertical position on the quadrant 94, then the throttle valve 14 is entirely under the control of the governor 56, which functions to maintain a constant rate of revolution of the output shaft 30 of the hydraulic power transmission device 22, 28. Note that the governor 56 is driven by this output shaft 30 and not by the gasoline engine output shaft 20. The magnitude of this constant rate of revolution of the output shaft 30 is predetermined by appropriate setting of the control lever 64 on the quadrant 66. Figure 2 illustrates how the governor 56 on too rapid revolution of the output shaft 30 acts to throttle the flow of fuel to the gasoline engine 10. As shown, the governor riser 60 then ascends, under the influence of the fly weights 58, which spread out under the action of the centrifugal force then generated. The right arm of the bell crank 82 is caused to rise and the left arm of the bell crank acts on the lever 88 (which then is fulcrumed at its pivot point on the link 90) so that the lower end of the lever 88 is displaced to the left, effecting a leftward displacement of the shaft 96. As explained hereinabove, such displacement of the shaft 96 serves to move the throttle valve 14 toward a closed position. Ordinarily and preferably the extreme position of the throttle valve 14 in moving toward closed position is the position wherein barely enough fuel is supplied to the engine to maintain the engine running without any load being imposed upon the output shaft 30.

When the rate of revolution of the output shaft 30 is reduced, then the riser 60 of the governor 56 descends, under the influence of the spring 62. As shown in Figure 3, the right arm of the bell crank 82 is then carried downwardly and the right lower end of the lever 88 is moved toward the right, carrying with it the shaft 96 whereby the throttle valve 14 is moved toward open position.

The stops 79 and 80 are so positioned with respect to the riser 60 of the governor 56 that when the riser 60 abuts against the stop 79 the throttle valve 14 will assume the extreme closed position shown in Figure 2 and when the riser 60 abuts against the stop 80 the throttle valve 14 will assume the extreme open position shown in Figure 3.

It is emphasized that the crane or other device operated from the instant power plant or prime mover is driven from the shaft 30 (and not directly from the gasoline engine shaft 20). Thus, the governor 56 maintains a constant predetermined line speed of the crane or the like, and does this by controlling the flow of fuel to the gasoline engine 10. In other words, while the rate of revolution of the output shaft 30 is constant, regardless of the load imposed upon the shaft 30 (within the power of the gasoline engine 10), the rate of fuel flow to the gasoline engine will vary according to the load imposed upon the shaft 30, and the rate of revolution of the gasoline engine 20 will also vary.

As shown, a predetermined constant line speed can be maintained automatically, no manual control operation being necessary, when the control lever 92 is set vertically on the quadrant 94. This predetermined constant line speed is maintained with minimum fuel consumption, and no more fuel passes at any time through the fuel conduit 12 than the amount required to operate the gasoline engine 10 at whatever rate may be required to maintain the predetermined rate of revolution of the output shaft 30 at whatever load imposed thereon.

It will be understood that when no load is applied to the output shaft 30, the engine 10 will idle at substantially the governor-set output shaft speed (which is adjusted by setting of the control lever 64, say, anywhere from 200 to 1,000 R. P. M.). With a smaller or greater positive load imposed upon the output shaft 30, the gasoline engine will speed up until the product of the engine output torque and the converter torque multiplication factor will balance the demand set up by the imposed positive load. This arrangement results in the reduction of maintenance, saving of fuel, elimination of wear and a reduction in operator fatigue due to noise and vibration. Particularly good results have been noted in the case of locomotive cranes, which often are operated under light loads and frequently have to be kept standing ready for service.

When the control lever 92 is manually moved to the right (as shown in Figures 4 and 6) or to the left (as shown in Figures 5 and 7), then manual control of the throttle valve 14 is brought about, overriding the control exercised by the governor 56. In the extreme positions of the control lever 92, shown in Figures 4 and 5, the control exercised by the governor 56 is completely eliminated. In the intermediate positions of the control lever 92, shown in Figures 6 and 7, the positioning of the control lever 92 sets limits for the control exercised by the governor 56. The effects brought about by various settings of the control lever 92 in various positions other than the vertical position shown in Figures 2 and 3 are explained hereinbelow.

When, as shown in Figures 4 and 6, the control lever 92 is displaced to the right, the link 90 is moved to the right, carrying with it the upper end of the lever 88. The latter is then fulcrumed at its pivotal connection with the link 86 so that the lower end of the lever 88 is caused to swing to the left, thereby displacing the shaft 96 to the left and moving the throttle valve 14 toward closed position. The above noted fulcrum point for the lever 88 (which is positioned between the ends of the lever 88) is then not stationary, but is moved some slight distance to the right. In other words, the lever 88, when moved by the link 90, then pivots (1) at its pivotal connection with the link 86 and (2) at its pivotal connection with the shaft 96. The first pivotal connection is moved in the direction of movement of the link 90 while the second pivotal connection is moved in the opposite direction.

In the position of the control lever 92 shown in Figure 4, the lever has been set in its extreme position on the right side of the quadrant 94, and the throttle valve 14 has been moved to its extreme closing position. The governor 56 has been cut out completely, being held against the stop 80. In the position of the control lever 92 shown in Figure 6, the control lever 92 has been set in a position intermediate between those shown in Figures 2 and 4, and the throttle valve 14 still remains a limited angular distance from its extreme closing position. To the extent of this limited angular distance, the throttle valve 14 is still under control of the governor 56. For instance, on acceleration of the shaft 30 to a predetermined excessive rate of revolution, the governor riser can still operate to swing up the right arm of the bell crank 82 and move the lower end of the lever 88 to the left, whereby the throttle valve 14 is moved over part or all of said limited angular distance toward its extreme closing position. Note that, as the lever 92 is moved to the right, the movement in the same direction of the pivotal connection between the lever 88 and the link 86 forces the riser 60 downwardly against the stop 80 and that this position of the riser 60 is reached before the lever 92 has been moved to its extreme right side position. The closing of the throttle valve 14 directly effected by rightward movement of the lever 92 may cause deceleration of the shaft 52 which will cause the riser 60 to move downwardly against the stop 80 and hold the riser there. Thus, the riser is no longer responsive to decreased speed of the shaft 52 to open the throttle valve 14. But the riser 60 is still responsive to increased speed of the shaft 52 to move the throttle valve further toward its extreme closed position, and (after such response) can then respond to decreased speed of the shaft 52, although only by returning the throttle valve 14 to the position assumed when the lever 92 was moved to the right. In other words, to the extent of the setting of the control lever 92 toward the right of the quadrant 94, an upper limit is set for fuel admission to the gasoline engine 10, but below this limit the governor 56 is still operative to control the admission of fuel in response to variations in rate of revolution of the output shaft 30.

In the position of the control lever 92 shown in Figure 5, the lever 92 has been set in its extreme position on the left side of the quadrant 94, and the throttle valve 14 has been moved to its extreme open position. The governor 56 has been cut out completely. In the position of the control lever 92 shown in Figure 7, the control lever 92 has been set in a position intermediate between those shown in Figures 2 and 5 and the throttle valve 14 still remains a limited angular distance from its extreme open position. To the extent of this limited angular distance, the throttle valve 14 is still under the control of the governor 56. For instance, on deceleration of the shaft 30 to a predetermined insufficient rate of revolution, the governor riser 60 can still operate to depress the right arm of the bell crank 82 and to move the lower end of the lever 88 to the right, whereby the throttle valve 14 is moved over part or all of the said limited angular distance toward its extreme open position. Note that, as the lever 92 is moved to the left, the movement in the same direction of the pivotal connection between the lever 88 and the link 86 forces the riser 60 upwardly against the stop 79 and that this position of the riser 60 is reached before the lever 92 has been moved to its extreme left side position. The opening of the throttle valve 14 directly effected by the leftward movement of the lever 92 may cause acceleration of the shaft 52 which will cause the riser 60 to move upwardly against the stop 79 and hold the riser there. Thus, the riser is no longer responsive to increased speed of the shaft 52 to close the throttle valve 14. But the riser 60 is still responsive to decreased speed of the shaft 52 to move the throttle valve further toward its extreme closed position, and (after such response) can then respond to increased speed of the shaft 52, although only by returning the throttle valve 14 to the position assumed when the lever 92 was moved to the left. In other words, to the extent of the setting of the control lever 92 toward the left of the quadrant 94, a lower limit is set for fuel admission to the gasoline engine 10, but above this limit the governor 56 is still operative to control the admission of fuel in response to variations in rate of revolution of the output shaft 30.

It will thus be noted that, except in the two extreme positions of the control lever 92, the governor 56 is operative on the throttle valve 14 at substantially the predetermined rate of revolution of the output shaft 30, in spite of the fact that movement of the control lever 92 changes the location of the fulcrum point of the lever 88 when acted upon by force transmitted from the governor 56. But moving the control lever 92 to the right sets an upper limit for rate of fuel admission which is not exceeded by action of the governor 56, while moving the control lever 92 to the left sets a lower limit for rate of fuel admission which likewise is not exceeded by action of the governor 56. Further, the said upper limit set by movement to the right of the control lever 92 may result in speeds of the output shaft 30 which, at least under some relatively heavy loads, may be less than the governor-controlled speed of said shaft. And the said lower limit set by movement to the left of the control lever 92 may result in speeds of the output shaft 30 which, at least under some relatively light loads, may exceed the governor-controlled speed of said shaft.

To explain further the effect of moving the control lever 92, it may be noted that in the vertical position of the lever 88 illustrated in Figure 1, the point of connection of this lever with the link 86 is at exactly the position assumed when the shaft 30 is operating at the rate for which the governor 56 is set. Further, the control lever 92 and the link 90 are in a position such as in no manner to change the throttle setting at which the rate of fuel admission is that effecting the rate of revolution of the shaft 30 for which the governor 56 is set. Then acceleration or deceleration of the shaft 30 will cause the governor 56 to act to reduce or to increase the rate of fuel admission. But movement of the control lever 92 to the right or to the left will swing the lever 88 around its point of connection with the link 86 to move the throttle valve 14 toward closed or open position, overriding the action of the governor 56 progressively until at the two extreme positions of the control lever 92, control of the rate of fuel admission by the governor 56 is completely eliminated.

In the case of a locomotive crane (which conventionally is equipped with a travel clutch as an operative connection between the output shaft and the wheels or other means where force is ultimately applied) the operator may move the control lever 92 to its extreme right-hand position so that the engine 10 will merely idle and then engage the travel clutch (with a load in position to be moved) whereby the output shaft 30 will be brought to a standstill with substantially no force applied to the load. Then the operator may move the control lever 92 to vertical position whereby the throttle valve 14 will open until the rate of revolution of the output shaft 30 will rise to the value for which the governor 56 is set. In this manner the operator can ease into his load and reach the governor-set speed smoothly. A rate of load movement greater than the speed for which the governor is set can then be secured if desired by moving the control lever to the left, to the ultimate point where the full safe speed of the engine 10 is utilized, at which point the governor 36 will operate to prevent flow of fuel at any greater rate to the engine.

Many details of construction may be varied without departing from the purpose of this invention, as by substituting hydraulically operated governors for those shown, and otherwise. It is, therefore, not my purpose to limit the patent granted on this invention otherwise than necessitated by the scope of the appended claims.

I claim as my invention:

1. A power plant comprising an internal combustion engine having a throttle valve controlling the rate of admission of fuel to the engine, a hydraulic power transmission device driven by said engine and provided with a power output shaft, a governor actuated by said output shaft, a lever, means connecting one end of said lever with said throttle valve for varying the position thereof, a manually operable control connected to the other end of said lever for moving said lever to actuate said means, and further means connecting said governor to said lever between the ends thereof for moving said lever to actuate said valve position varying means.

2. A power plant comprising an internal combustion engine having a throttle valve controlling the rate of admission of fuel to the engine, a hydraulic power transmission device driven by said engine and provided with a power output shaft, a governor responsive to the rate of rotation of said output shaft, a lever having a first end and a second end, means operatively connecting said first lever end to said throttle valve for varying the position of said throttle valve according to movement of said first lever end and along a fixed path generally transverse to said lever, means operatively connecting said governor with said lever at a point between said two lever ends for moving said first lever end under the actuation of said governor, a manually operable control operatively connected to said second lever end for moving said first lever end, said second lever end functioning as a fulcrum for said lever when moved by force transmitted from said governor, and said point between said lever ends functioning as a fulcrum for said lever when moved by force transmitted from said manual control.

3. A power plant according to claim 2 comprising a stop for limiting movement of said governor in a direction effective to move said lever, said governor being moved against said stop upon operation of said manual control.

4. A power plant comprising an internal combustion engine having a throttle valve controlling the rate of admission of fuel to the engine and movable between a first position wherein the valve admits fuel at a fast rate and a second position wherein the second valve admits fuel at a slow rate, a hydraulic power transmission device driven by said engine and provided with a power output shaft, a governor responsive to the rate of rotation of said output shaft, a lever having a first end and a second end, means for confining movement of said first lever end to a fixed path and also operative to translate such movement into movement of said throttle valve between said two positions, a manually operable device for selectively positioning the second lever end on points on a line generally parallel with said fixed path, and means connecting said governor with said lever between the ends thereof operative to move said first lever end along said path in a direction tending to close said throttle valve when rotation of said output shaft is accelerated and in a direction tending to open said throttle valve when rotation of said output shaft is decelerated, said second lever end functioning as a fulcrum for said lever when said second lever end is moved under the influence of force transmitted from said governor, and said movement of said second lever end under the influence of force transmitted from said manually operable device also serving to effect movement of said first lever end along said path, said lever then being fulcrumed at the lever point serving as a connection between said lever and said governor, whereby manual operation of said device for selectively positioning said second lever end overrides the action of said governor with respect to the control of rate of admission of fuel to said engine.

5. A power plant according to claim 4 comprising a stop for limiting movement of said governor in a direction effective to move said lever, said governor being moved against said stop upon operation of said manually operable device.

6. A power plant according to claim 4 in which said second lever end is movable along a line including a first terminal point at which said manually operable device completely overrides the action of said governor to maintain said first lever end in a position holding said throttle valve in said first position, a second terminal point at which said manually operable device completely overrides the action of said governor to maintain said first lever end in a position holding said throttle valve in said second position, a middle point wherein said first lever end is fully subject to the action of said governor, a series of points between said first terminal point and said middle point wherein said manually operable device overrides the action of said governor to the extent of maintaining a lower limit for the rate of fuel admission and a series of points between said second point and said middle point wherein said manually operable device overrides the action of said governor to the extent of maintaining an upper limit for the rate of fuel admission, said upper and lower limits falling short of the upper and lower limits within which rate of fuel admission may be controlled by said governor when said second lever end is in said middle point.

7. A power plant according to claim 6 comprising a stop for limiting movement of said governor in a direction effective to move said lever, said governor being moved against said stop upon operation of said manually operable device.

8. A power plant comprising an internal combustion engine having a throttle controlling the rate of admission of fuel to the engine, a hydraulic power transmission device driven by said engine and provided with a power output shaft, a governor responsive to the rate of rotation of said output shaft, a lever having a first end and a second end, means operatively connecting said first lever end to said throttle valve for varying the rate of fuel admission according to the position of said first lever end, means for selectively positioning said second lever end on points along a fixed line and means operatively connecting said governor with said lever between the two ends thereof for effecting movement of said first lever end under the influence of force transmitted from said governor to vary the rate of fuel admission in inverse proportion to the rate of rotation of said output shaft, said second lever end serving as a fulcrum when said lever is moved by force transmitted from said governor, and said means for selectively positioning said second lever end being operative to swing said lever about the lever point connected with said governor to override the action of said governor in the control of rate of fuel admission.

9. A power plant according to claim 8 in which said means for selectively positioning said second lever end when positioned on a middle point on said fixed line thereby places said first lever end in a position generally central with respect to the two extreme positions between which said first lever end is movable under the influence of force transmitted from said governor whereby said rate of fuel admission is placed under the control of said governor.

10. A power plant comprising an internal combustion engine having a throttle controlling the rate of admission of fuel to the engine, a hydraulic power transmission device driven by said engine and provided with a power output shaft, a governor responsive to the rate of rotation of said output shaft, a lever swingable between various angular positions and having first and second ends, means operatively connecting said first lever end with said throttle valve for varying the position of said throttle valve, means for selectively positioning said second lever end at various positions on a fixed line, and means operatively connecting said governor with said lever at a point between the said lever ends for swinging said lever around said second lever end as a fulcrum to control the rate of fuel admission for keeping constant the rate of revolution of said output shaft, said lever being further swingable about said point between said lever ends under the action of said selective positioning means for controlling the rate of fuel admission independently of said governor.

11. A power plant according to claim 10 in which said lever when fulcrumed at said point between said lever ends can be selectively swung by the action of said selective positioning means between two extreme angular positions wherein said throttle valve will assume its extreme positions, one angular position of said lever between said extreme angular positions permitting full control by said governor of said rate of fuel admission.

12. A power plant according to claim 11 in which said one angular position of said lever between said extreme angular positions is the angular position of said lever coinciding with the lever position assumed under the influence of said governor when said output shaft is rotated at a rate set by said governor.

13. A power plant according to claim 10 comprising stop means for limiting movements of said governor in directions effective to move said lever, said governor being moved against said stop means upon operation of said selective positioning means.

14. A power plant according to claim 13 in which upon operation of said selective positioning means in a throttle closing direction said governor is moved in throttle opening direction against a stop and in which upon operation of said selective positioning means in a throttle opening direction said governor is moved in throttle closing direction against a stop, said stops being located so that said governor is moved thereagainst before said selective positioning means has positioned said second lever end at an end point on said fixed line.

RAYMOND E. ORTON.

REFERENCES CITED

The following references are of record in the file of this patent:

UNITED STATES PATENTS

| Number | Name | Date |
| --- | --- | --- |
| 1,259,090 | Ferris et al. | Mar. 12, 1918 |
| 1,843,960 | Sticelber | Feb. 9, 1932 |
| 1,868,130 | Bauer et al. | July 19, 1932 |
| 2,556,378 | Sisson | June 12, 1951 |